United States Patent [19]

Yada

[11] Patent Number: 5,094,498
[45] Date of Patent: Mar. 10, 1992

[54] MOLDING UNIT FOR USE WITH AN AUTOMOBILE

[75] Inventor: Yukihiko Yada, Obu, Japan

[73] Assignee: Tokai Kogyo Kabushiki Kaisha, Obu, Japan

[21] Appl. No.: 698,827

[22] Filed: May 13, 1991

[30] Foreign Application Priority Data

May 16, 1990 [JP] Japan .................. 2-50991[U]
May 30, 1990 [JP] Japan .................. 2-57029[U]

[51] Int. Cl.$^5$ ............................... B60J 1/20
[52] U.S. Cl. ....................... 296/93; 296/201; 52/208
[58] Field of Search .......... 296/93, 201; 52/208, 52/400

[56] References Cited

U.S. PATENT DOCUMENTS

| | | | |
|---|---|---|---|
| 4,757,660 | 7/1988 | Miyakawa et al. | 52/400 |
| 4,840,001 | 6/1989 | Kimisawa | 52/208 |
| 4,884,380 | 12/1989 | Yada et al. | 296/93 |
| 4,968,543 | 11/1990 | Fujioka et al. | 296/93 |
| 4,984,839 | 1/1991 | Miyakawa et al. | 296/93 |
| 5,009,460 | 4/1991 | Iwata et al. | 296/93 |

FOREIGN PATENT DOCUMENTS

63-32915 3/1988 Japan.
63-32916 3/1988 Japan.

Primary Examiner—Robert R. Song
Attorney, Agent, or Firm—Dennison, Meserole, Pollack & Scheiner

[57] ABSTRACT

A molding unit mainly includes a molding body which has a covering portion, and a complemental member which is positioned longitudinally along the molding body and which has a weir portion. When the molding body with the complemental member is positioned along a windshield of an automobile, the covering portion of the molding body is seated on the outside surface of the windshield at the portion along which the complemental member is not positioned and the lower edge of the weir portion of the complemental member is seated on the outside surface of the windshield at the portion along which the complemental member is positioned.

12 Claims, 6 Drawing Sheets

MOLDING UNIT FOR USE WITH AN AUTOMOBILE

BACKGROUND OF THE INVENTION

The present invention relates to a molding unit for use with an automobile, and more particularly, the invention relates to a molding unit which can perfectly seal a clearance between a windshield and an automobile body and which can be used even when the gap height between the outside surface of the windshield and the outside surface of the roof panel of the automobile body is different from that between the outside surface of the windshield and the outside surface of the front pillar of the automobile body.

The conventional molding unit for use with an automobile generally comprises a molding body which is installed in a clearance between the circumferential edge of the windshield and the automobile body and which has a leg portion to be inserted into the clearance, an outer covering portion contactable with the automobile body and an inner covering portion contactable with the windshield, and fasteners positioned in the clearance and mounted on the body by adhesive or double sided tape. The fasteners engage the leg portion of the molding body to fixedly support the molding body in the clearance.

Such a conventional molding unit is found, for example, in Japanese Laid-Open Utility Model Publication Nos. 63-32915 and 63-32916.

Japanese Publication No. 63-32915 discloses a molding unit of which the molding body has a weir portion to downwardly lead rainwater therealong. The weir portion is formed by partly removing the inner covering portion of the molding body along the front pillar of the automobile body.

A problem usually associated with the prior art molding unit as described in Japanese Publications No. 63-32915 is that such a molding unit is not adaptable when the gap height between the outside surface of the windshield and the outside surface of the front pillar of the automobile body is greater than that between the outside surface of the windshield and the outside surface of the roof panel of the automobile body, because in the molding body corresponding to the front pillar, a clearance is formed between the inner covering portion of the molding body and the outer surface of the windshield, causing entry of rainwater into the clearance between the circumferential edge of the windshield and the automobile body.

Another problem usually associated with the prior art molding unit as described in Publication No. 63-32915 is that the molding body exhibits undesirable awkward appearance because the inner covering member of the molding body is partly removed to form the weir portion.

The Japanese Publication No. 63-32916 discloses a molding unit of which the molding body has a weir member to downwardly lead rainwater therealong. The weir member is independently formed and is bonded to the inner covering portion of the molding body along the front pillar of the automobile body.

A problem usually associated with the prior art molding unit as described in Japanese Publications Nos. 63-32916 is that the molding body requires increased working time to be formed because the weir member has to be independently formed and subsequently has to be bonded to the inner covering portion of the molding body along the front pillar.

Another problem usually associated with the prior art molding unit as described in Publication No. 63-32916 is that the molding body exhibits undesirable awkward appearance because the inner covering member of the molding body is bonded with the weir member along the front pillar.

SUMMARY OF THE INVENTION

It is an object of the invention to provide an improved molding unit for use with an automobile, that is, to provide a molding unit which is applicable even when the gap height between the outside surface of the windshield and the outside surface of the roof panel of the automobile body is different from that between the outside surface of the windshield and the outside surface of the front pillar of the automobile body.

It is another object of the invention to provide a molding unit for use with an automobile, that is, to provide a molding unit in which the problem associated with the conventional molding unit is eliminated.

A molding unit of the present invention includes a molding body, a complemental covering member positioned longitudinally along the molding body, and a plurality of fasteners provided on the automobile body for fastening the molding body with the covering member to the automobile body. The molding body has a leg portion and a covering portion integrally provided on the upper portion of the leg portion. The complemental member has a weir portion and a fitting portion which is integrally formed with the weir portion and is adapted to be fitted to the leg portion of the molding body. When the molding body with the complemental member is positioned along the windshield, the covering portion of the molding body is seated on the outside surface of the windshield at the portion along which the complemental member is not positioned and the lower edge of the weir portion of the complemental member is seated on the outside surface of the windshield at the portion along which the complemental member is positioned.

An important feature of the present invention is that the molding body is adaptable even when the gap height between the outside surface of the windshield and the outside surface of the roof panel of the automobile body is different from that between the outside surface of the windshield and the outside surface of the front pillar of the automobile body.

Another feature of the present invention is that the molding body exhibits a good appearance because the configuration of the molding body is uniform throughout the overall length thereof.

The present invention will become more fully apparent from the claims and the description as it proceeds in connection with the drawings.

DETAILED DESCRIPTION OF THE PREFERRED EMBODIMENT

Figure 2:
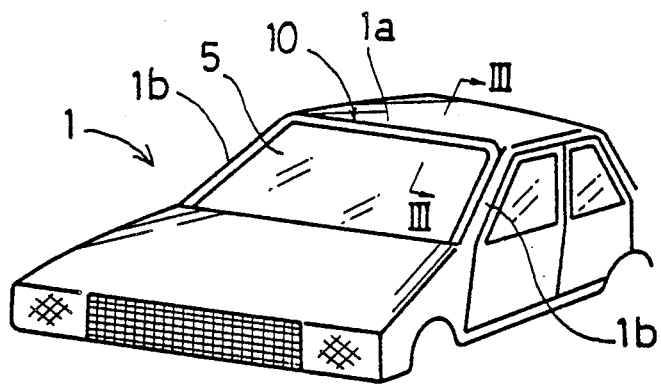
FIG. 2 is a schematic illustration of an automobile showing several portions mounting a molding unit according to a first embodiment of the present invention.

Referring to FIG. 2, a front windshield 5 is provided on a body 1 of an automobile. The windshield 5 is effectively supported on a roof panel 1a of the automobile body 1 and on front pillars 1b integrally formed with the roof panel 1a. A molding 10 is installed in a clearance between the edge surface of the windshield 5 and the automobile body 1.

Referring now to FIGS. 1 and 3 to 5, shown therein is a molding unit according to a first embodiment of the invention. The molding unit includes the molding 10 which comprises a molding body 11 and a weir member or complemental member 21, and a fastener 30 to fixedly support the molding 10 on the automobile body 1.

Figure 1:
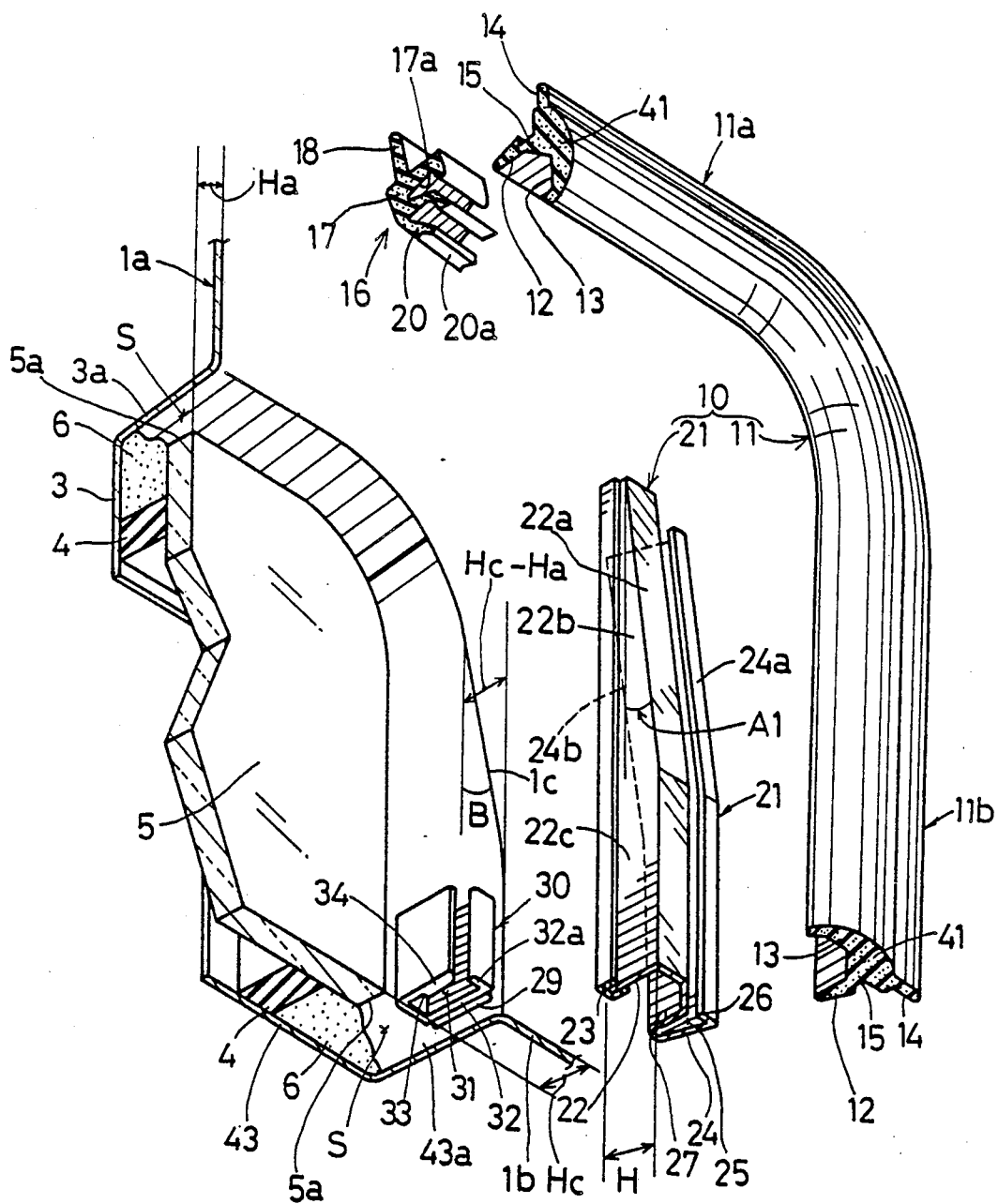
FIG. 1 is a perspective view of a molding body, a complemental member and an automobile body portion to which these members are installed.

As shown in FIG. 1, the roof panel 1a and the front pillars 1b are interconnected to form arcuate portions C therebetween. The peripheral edge of the roof panel 1a is inwardly folded to form a slanted wall portion 3a and a flanged portion 3. The peripheral edge of each front pillar 1b is also inwardly folded to form a slanted wall portions 43a and a flanged portions 43 which are integral with the wall portions 3a and the flanged portion 3, respectively.

As will be appreciated, the gap height Ha between the outside surface of the windshield 5 and the outside surface of the roof panel 1a is smaller than the gap height Hc between the outside surface of the windshield 5 and the outside surfaces of the front pillars 1b. In other words, the height of the wall portion 3a is lower than that of the wall portions 43a. Therefore, each of the front pillars 1b is formed with an inclined portion 1c through which the roof panel 1a is connected to the front pillars 1b.

The windshield 5 is circumferentially provided with a dam member 4 formed of a rubber or the like and is bonded to the flanged portions 3, 43 with an adhesive 6.

The wall portion 43a of each front pillar 1b is provided with a plurality of fasteners 30, at suitable intervals, with double-sided tape 29. Each of the fasteners 30 has a substantially U-shaped cross-sectional configuration and is formed of resilient material such as rubber and synthetic resin. The fastener 30 has a first and second walls 32, 34 to form a groove 31 therebetween. The first wall 32 of the fastener 30 is provided with a projection 32a projecting into the groove 31 and extending throughout the overall length thereof. The second wall 34 of the fastener 30 is formed with a shoulder portion 33 facing the bottom surface of the groove 31.

The molding body 11 is formed of resilient material such as rubber and synthetic resin and has a uniform cross-sectional configuration throughout the overall length thereof. The molding body 11 includes a first molding section 11a which is positioned along the roof panel 1a and second molding sections 11b which are positioned along the front pillars 1b. Each of these sections 11a, 11b of the molding body 11 has a substantially T-shaped cross-sectional configuration and comprises a leg portion 12 which is inserted into a clearance S between the wall portions 3a, 43a and an edge surface 5a of the windshield 5, and a covering portion 41 which is integrally formed with the leg portion 12 and which is sized to sufficiently cover the clearance S between the wall portion 3a, 43a and the edge surface 5a. The covering portion 41 includes an outer covering portion 14 to cover the edge portions of the roof panel 1a and the front pillars 1b and an inner covering portion 13 to cover the edge portion of the windshield 5. The leg portion 12 is formed longitudinally with a groove 15 which is positioned adjacent to the covering portion 41 and which extends throughout the overall length thereof.

Each of the second sections 11b of the molding body 11 is provided with the complemental member 21 which extends substantially throughout the overall length of the second section 11b.

The complemental member 21 includes a weir portion 22 and a fitting portion 24 having a substantially U-shaped cross-sectional configuration. The fitting portion 24 is integrally formed with the weir portion 22 and has an engagement groove 25 which is engageable with the leg portion 12 of the molding body 11. The fitting portion 24 is formed with a flange or projection 26 projecting into the groove 25 and extending throughout the overall length thereof. In addition, the fitting portion 24 is formed with a shoulder portion 27 at the lower end thereof. The lower end of the weir portion 22 is provided with a resilient member 23 formed of material such as rubber and synthetic resin. and extending throughout the overall length thereof. Further, the height H of the weir portion 22 is adapted to conform substantially to the gap height Hc-Ha between the roof panel 1a and the front pillar 1b.

The weir portion 22 of the complemental member 21 is formed with an upper inclined surface 22a at a portion corresponding to the inclined portion 1c of the front pillar 1b thereby to be formed with a reduced height portion 22b having a triangular configuration. As will be appreciated, the length of the inclined surface 22a is substantially equal to that of the inclined portion 1c of the front pillar 1b, and the inclination angle A1 of the inclined surface 22a is substantially identical with the inclination angle B of the inclined portion 1c. Further, the other portion of the weir portion 22 will hereinafter be referred to as a full height portion 22c.

The fitting portion 24 of the complemental member 21 is formed with an upper inclined surface 24a coplanar with the inclined surface 22a and is formed with a lower inclined surface 24b parallel to the upper inclined surface 24a.

As will be understood, the inclination angle A1 of the upper inclined surfaces 22a, 24a can be modified to conform to a modified inclination angle of the inclined portion 1c of the front pillar 1b. In addition, second inclined surfaces can be formed on the weir portion 22 and the fitting portion 24 when the front pillar 1b includes a second inclined portion (not shown).

Figure 4:
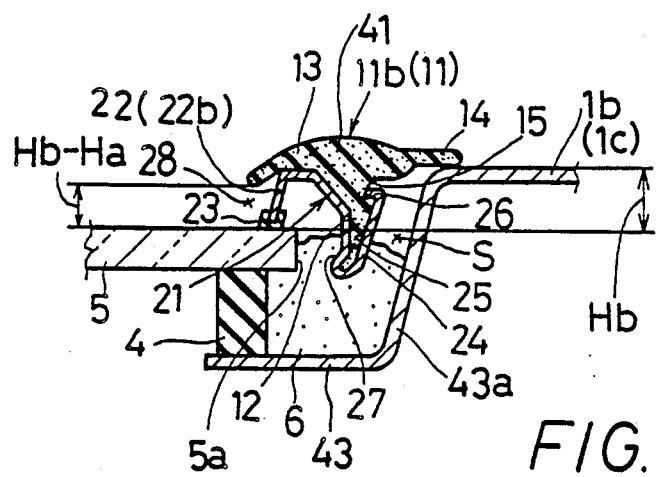
FIG. 4 is a sectional view taken along the line IV—IV of FIG. 3.
Figure 5:
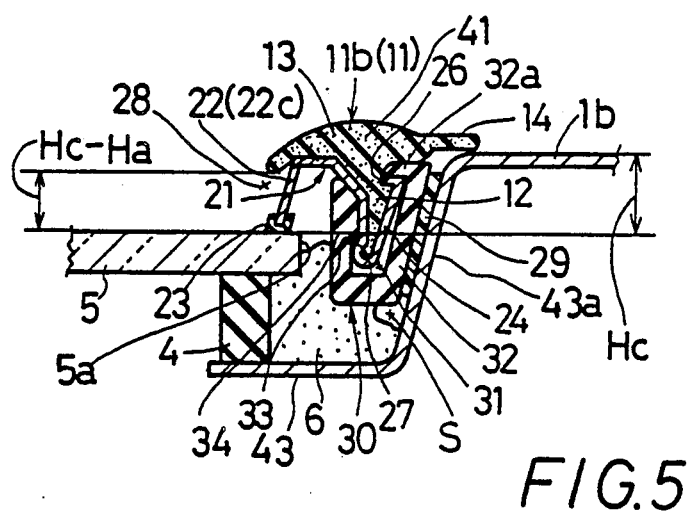
FIG. 5 is a sectional view taken along the line V—V of FIG. 3.

As shown in FIGS. 4 and 5, the complemental member 21 as formed above is incorporated in the second section 11b of the molding body 11 by fitting the leg portion 12 of the molding body 11 into the engagement groove 25 of the complemental member 21. When the leg portion 12 is completely inserted into the engagement groove 25, the projection 26 of the fitting portion 24 is engaged with the groove 15 to effectively prevent the complemental member 21 from slipping off. As will be appreciated, the complemental member 21 is positioned in such a way that the inclined surfaces 22a, 24a of the complemental member 21 correspond to the inclined portion 1c of the front pillar 1b.

Figure 3:
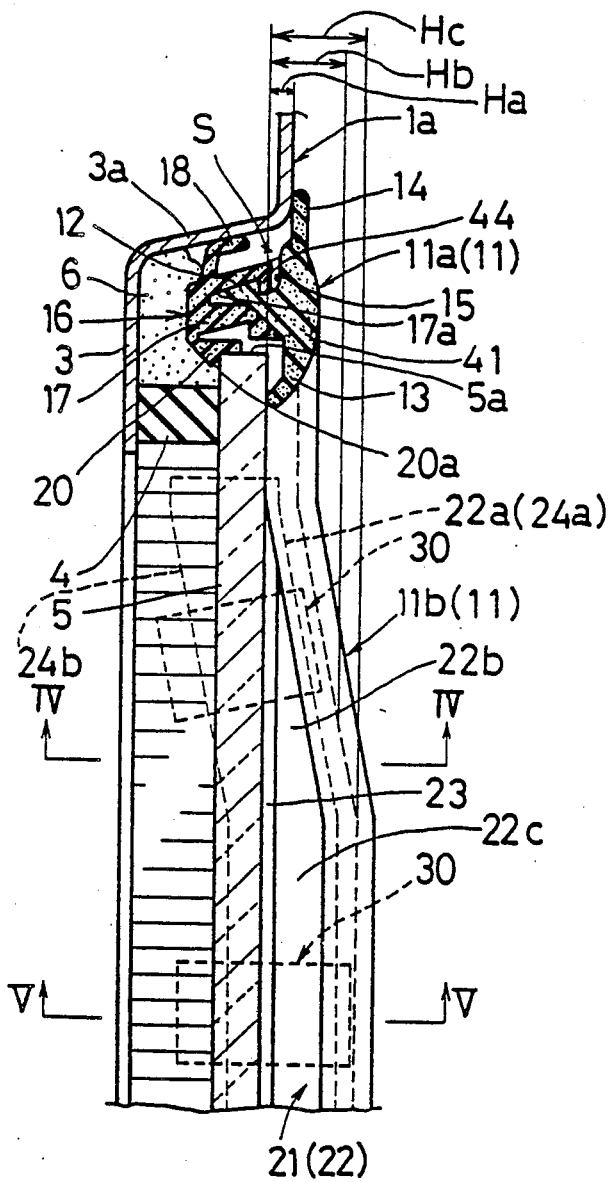
FIG. 3 is a sectional view taken along the line III—III of FIG. 2.

As shown in FIG. 3, the first section 11a of the molding body 11 is provided with fasteners 16, at suitable intervals. Each of the fasteners 16 is formed of resilient material such as rubber and synthetic resin. The fastener 16 comprises a main body 17 which has a substantially U-shaped cross-sectional configuration, an engagement lip 18 integrally formed with the main body 17, and a lip 20 integrally formed with the main body 17 and having a shoulder portion 20a engageable with the upper edge of the windshield 5. The main body 17 has an engagement groove 17a which can receive the leg portion 12 of the molding body 11 therein. The main body 17 is formed with a projection 44 projecting into the groove 17a.

As shown in FIG. 3, the fastener 16 as formed above is incorporated in the first section 11a of the molding body 11 by fitting the leg portion 12 of the molding body 11 into the engagement groove 17a of the main body 17. When the leg portion 12 is completely inserted into the engagement groove 17a, the projection 44 of the main body 17 is engaged with the groove 15 of the leg portion 12 to effectively prevent the fastener 16 from slipping off.

The molding 10 is installed to the automobile body 1 by inserting the leg portion 12 of the molding body 11 into the clearance S between the edge surface 5a of the windshield 5 and the automobile body 1.

As shown in FIG. 3, at the first section 11a of molding body 11 which corresponds to the roof panel 1a and to which the complemental member 21 is not fitted, the outer covering portion 14 and the inner covering portion 13 are closely seated on the outside surface of the roof panel 1a and the outside surface of the windshield 5, respectively. The engagement lip 18 of the fastener 16 is pressed against the wall portion 3a. The shoulder portion 20a of the lip 20 is engaged with the upper edge of the windshield 5 Thus, the first section 11a of the molding body 11 is fixedly supported between the roof panel 1a and the windshield 5.

As shown in FIGS. 4 and 5, at the second section 11b of the molding body 11 which corresponds to the front piller 1b, the outer covering portion 14 is closely seated on the outside surface of the front pillar 1b and the resilient member 23 of the weir member 22 is closely seated on the outside surface of the windshield 5. Further, as shown in FIG. 5, at a portion of the second section 11b which corresponds to the fastener 30, the fitting portion 24 of the complemental member 21 provided on the leg portion 12 of the molding body 11 is inserted into the groove 31 of the fastener 30 where the upper surface of the frange or projection 26 and the shoulder portion 27 of the fitting portion 24 are engaged with the projection 32a and the shoulder portion 33 of the fastener 30, respectively. Thus, the second section 11b of the molding body 11 fitted with the complemental member 21 is fixedly supported between the front piller 1b and the windshield 5.

As shown in FIGS. 4 and 5, when the second section 11b of the molding body 11 is incorporated into the automobile body 1, a groove 28 is formed along the complemental member 21. The groove 28 has a width of Hb-Ha at a portion corresponding to the reduced height portion 22b of the weir portion 22 (FIG. 4) and of Hc-Ha at a portion corresponding to the full height portion 22c of the weir portion 22 (FIG. 5). The groove 28 acts as a guide groove to effectively lead rainwater therealong.

Referring now to FIGS. 6 to 10, shown therein is a molding unit according to a second embodiment of the invention. The molding unit includes a molding 110 which comprises a molding body 111 and a weir member or complemental member 121, and a fastener 130 to fixedly support the molding 110 on the automobile body 1. The molding 110 is installed in a clearance between the edge surface of the windshield 5 and the automobile body 1. In these drawings, like reference characters refer to the same or similar parts throughout these figures.

Figure 6:
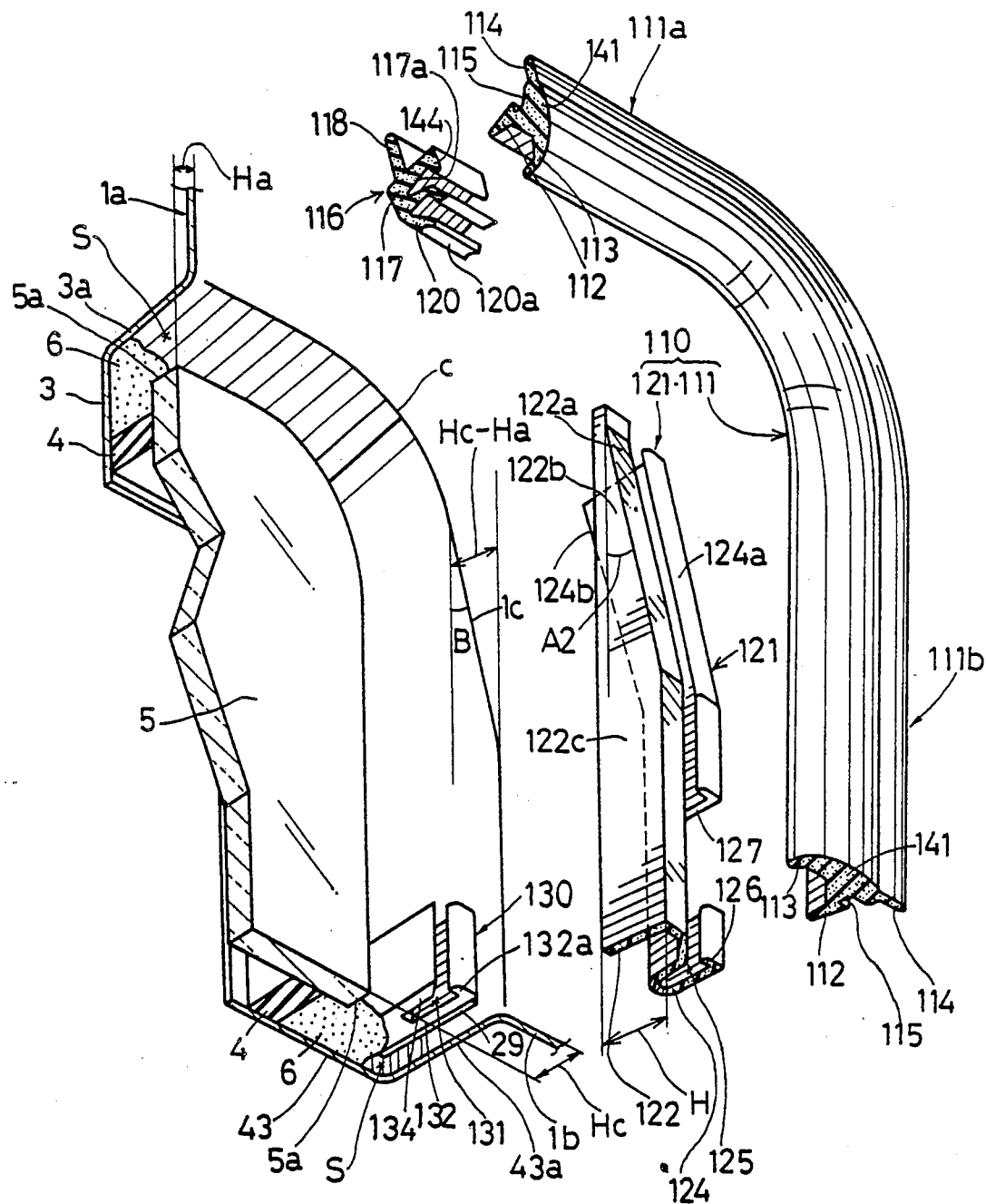
FIG. 6 is a view similar to FIG. 1, showing a molding unit according to a second embodiment of the present invention.

As shown in FIG. 6, the wall portion 43a of each front pillar 1b is provided with a plurality of fasteners 130, at suitable intervals, with double sided tape 29. Each of the fasteners 130 has a substantially U shaped cross-sectional configuration and is formed of resilient material such as rubber and synthetic resin. The fastener 130 has a first and second walls 132, 134 to form a groove 131 therebetween. The first wall 132 of the fastener 130 is provided with a projection 132a projecting into the groove 131 and extending throughout the overall length thereof.

The molding body 111 is formed of resilient material such as rubber and synthetic resin and has a uniform cross-sectional configuration throughout the overall length thereof. The molding body 111 includes a first molding section 111a which is positioned along the roof panel 1a and second molding sections 111b which are positioned along the front pillars 1b. Each of these sections 111a, 111b of the molding body 111 has a substantially T-shaped cross-sectional configuration and comprises a leg portion 112 which is inserted into a clearance S between the wall portions 3a, 43a and the edge surface 5a of the windshield 5, and a covering portion 141 which is integrally formed with the leg portion 112 and which is sized to sufficiently cover the clearance S between the wall portion 3a, 43a and the edge surface 5a. The covering portion 141 includes an outer covering portion 114 to cover the edge portions of the roof panel 1a and the front pillars 1b and an inner covering portion 113 to cover the edge portion of the windshield 5. The leg portion 112 is formed longitudinally with a groove 115 which is positioned adjacent to the covering portion 141 and which extends throughout the overall length thereof.

Each of the second sections 111b of the molding body 111 is provided with the complemental member 121 which extends substantially throughout the overall length of the second section 111b.

The complemental member 121 is formed of material such as rubber and synthetic resin and includes a weir portion 122 and a fitting portion 124 having a substantially U-shaped cross-sectional configuration. The fitting portion 124 is integrally formed with the weir portion 122 and has an engagement groove 125 which is engageable with the leg portion 112 of the molding body 111. The fitting portion 124 is formed with a projection 126 projecting into the groove 125 and extending throughout the overall length thereof. In addition, the engagement portion 124 is partially removed to form notches 127 which are adapted to receive the fasteners 130. Further, the height H of the weir portion 122 is adapted to conform substantially to the gap height Hc-Ha between the roof panel 1a and the front pillar 1b.

The weir portion 122 of the complemental member 121 is formed with an upper inclined surface 122a at a portion corresponding to the inclined portion 1c of the front pillar 1b thereby to be formed with a reduced height portion 122b having a triangular configuration. As will be appreciated, the length of the inclined surface 122a is substantially equal to that of the inclined portion 1c of the front pillar 1b, and the inclination angle A2 of the inclined surface 122a is substantially identical with the inclination angle B of the inclined portion 1c. Further, the other portion of the weir portion 122 will hereinafter be referred to as a full height portion 122c.

The fitting portion 124 of the complemental member 121 is formed with an upper inclined surface 124a coplanar with the inclined surface 122a and is formed with a lower inclined surface 124b parallel to the upper inclined surface 124a.

As will be understood, the inclination angle A2 of the upper inclined surfaces 122a, 124a can be modified to conform to a modified inclination angle of the inclined portion 1c of the front pillar 1b. In addition, second inclined surfaces can be formed on the weir portion 122 and the fitting portion 124 when the front pillar 1b includes a second inclined portion (not shown).

Figure 8:
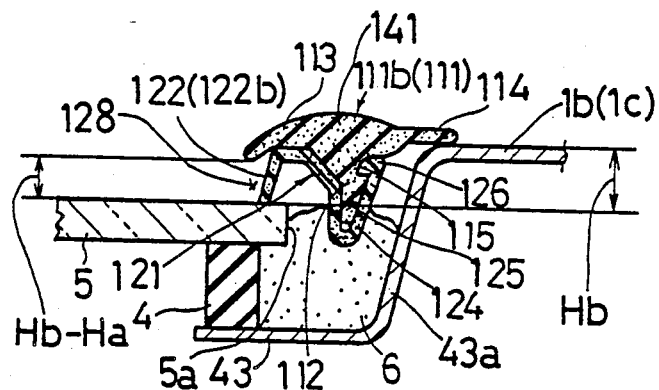
FIG. 8 is a sectional view taken along the line VIII-—VIII of FIG. 7.
Figure 9:
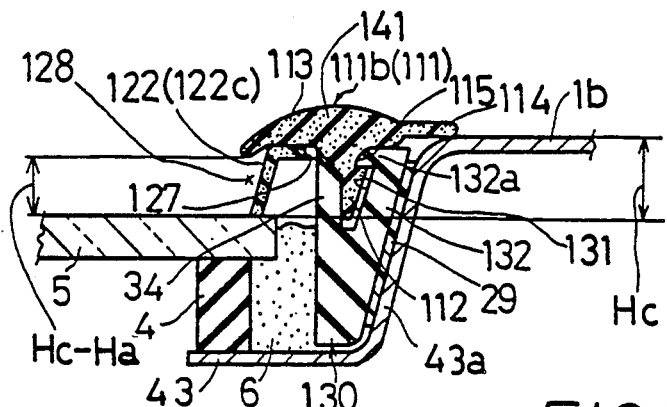
FIG. 9 is a sectional view taken along the line IX—IX of FIG. 7.
Figure 10:
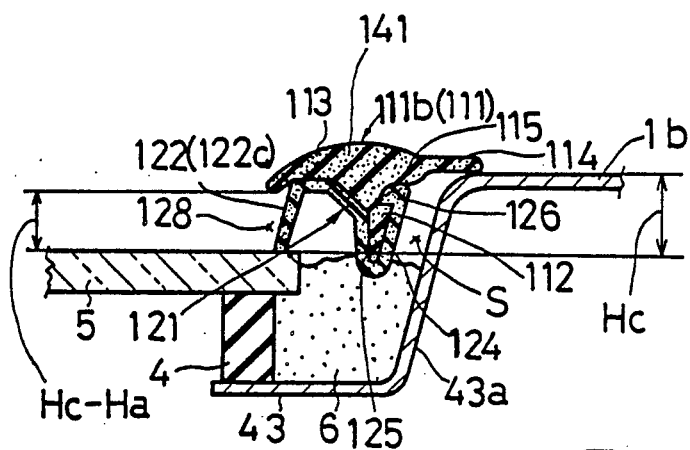
FIG. 10 is a sectional view taken along the line X—X of FIG. 7.

As shown in FIGS. 8 to 10, the complemental member 121 as formed above is incorporated in the second section 111b of the molding body 111 by fitting the leg portion 112 of the molding body 111 into the engagement groove 125 of the complemental member 121. When the leg portion 112 is completely inserted into the engagement groove 125, the projection 126 of the fitting portion 124 is engaged with the groove 115 to effectively prevent the complemental member 121 from slipping off. As will be appreciated, the Complemental member 121 is positioned in such a way that the inclined surfaces 122a, 124a of the complemental member 121 correspond to the inclined portion 1c of the front pillar 1b.

The first section 111a of the molding body 111 is Provided with fasteners 116, at suitable intervals. Each of the fasteners 116 is formed of resilient material such as rubber and synthetic resin. The fastener 116 comprises a main body 117 which has a substantially U shaped cross-sectional configuration, an engagement lip 118 integrally formed with the main body 117, and a lip 120 integrally formed with the main body 117 and having a shoulder portion 120a engageable with the upper edge of the windshield 5. The main body 117 has an engagement groove 117a which can receive the leg portion 112 of the molding body 111 therein. The main body 117 is formed with a projection 144 projecting into the groove 117a.

Figure 7:
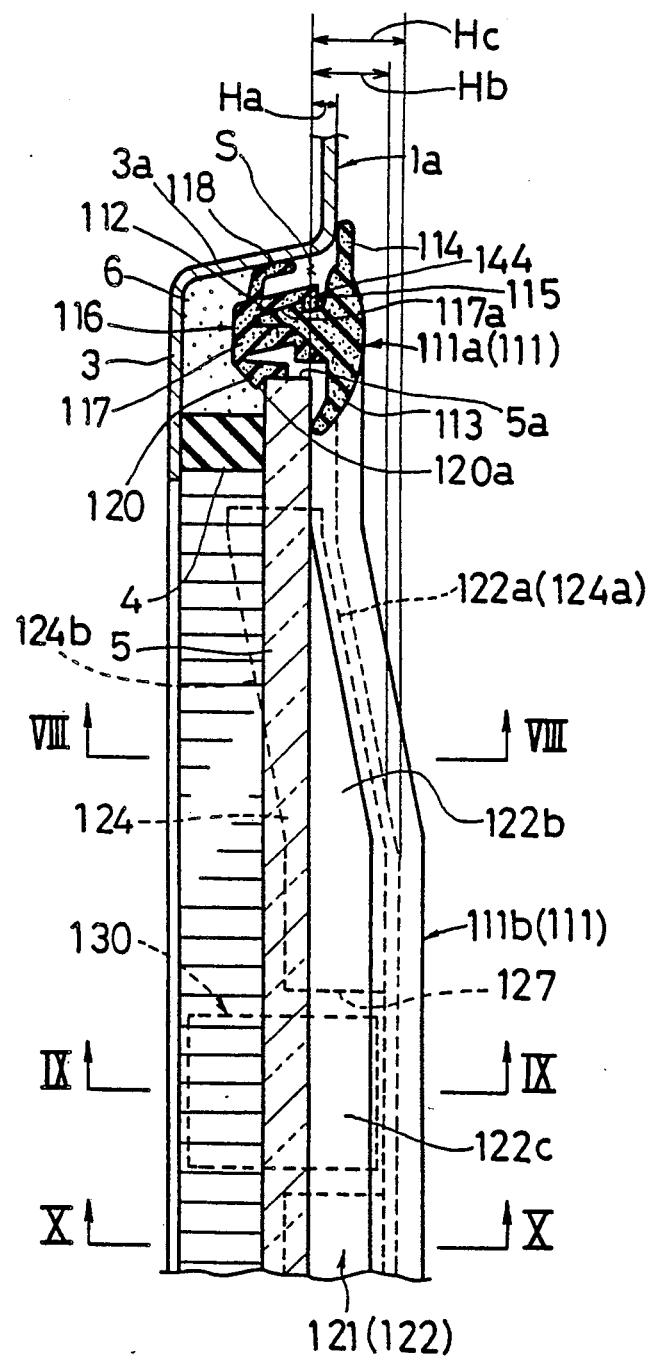
FIG. 7 is a view similar to FIG. 3.

As shown in FIG. 7, the fastener 116 as formed above is incorporated in the first section 111a of the molding body 111 by fitting the leg portion 112 of the molding body 111 into the engagement groove 117a of the main body 117. When the leg portion 112 is completely inserted into the engagement groove 117a, the projection 144 of the main body 117 is engaged with the groove 115 of the leg portion 112 to effectively prevent the fastener 116 from slipping off.

The molding 110 is installed to the automobile body 1 by inserting the leg portion 112 of the molding body 111 into the clearance S between the edge surface 5a of the windshield 5 and the automobile body 1.

As shown in FIG. 7, at the first section 111a of molding body 111, the outer covering portion 114 and the inner covering portion 113 are closely seated on the outside surface of the roof panel 1a and the outside surface of the windshield 5, respectively. The engagement lip 118 of the fastener 116 is pressed against the wall portion 3a. The shoulder portion 120a of the lip 120 is engaged with the upper edge of the windshield 5. Thus, the first section 111a of the molding body 111 is fixedly supported on the automobile body 1.

As shown in FIGS. 8 to 10, at the second section 111b of the molding body 111, the outer covering portion 114 is closely seated on the outside surface of the front pillar 1b and the lower end surface of the weir member 122 is closely seated on the outside surface of the windshield 5. Further, at a portion of the second section 111b which corresponds to the fastener 130, the leg portion 112 of the molding body 111 is inserted into the groove 131 of the fastener 130 where the projection 132a of the fastener 132 is engaged with the groove 115 of the molding body 111, as shown if FIG. 9. Thus, the second section 111b of the molding body 111 fitted with the complemental member 121 is fixedly supported on the automobile body 1.

As shown in FIGS. 8 to 10, when the second section 111b of the molding body 111 is incorporated into the automobile body 1, a groove 128 is formed along the complemental member 121. The groove 128 has a width of Hb-Ha at a portion corresponding to the reduced height portion 122b of the weir portion 122 (FIG. 8) and of Hc-Ha at a portion corresponding to the full height portion 122c of the weir portion 122 (FIGS. 9 and 10). The groove 128 acts as a guide groove to effectively lead rainwater therealong.

The preferred embodiments herein described are intended to be illustrative of the invention and not to limit the invention to the precise form herein described. They are chosen and described to explain the principles of the invention and their application and practical use to enable others skilled in the art to practice the invention.

What is claimed is:

1. A molding unit to seal a clearance between an automobile body and a windshield mounted on the automobile body, comprising:

a molding body having a leg portion extending along a circumferential edge of the windshield and a covering portion integrally provided on and extending along an upper side of said leg portion;

a complemental member longitudinally fitted along a part of said molding body, said complemental member having a weir portion and having a fitting portion which is integrally formed with said weir portion and is adapted to be fitted to said leg portion of said molding body; and a plurality of fasteners provided on the automobile body for fastening said molding body fitted with said complemental member to the automobile body, each of said fasteners having an engagement groove, wherein said fitting portion of said complemental member receiving said leg portion of said molding body therein is inserted into said engagement groove of said fastener where said molding body fitted with said complemental member is positioned along the windshield, wherein said covering portion of said molding body is seated on the outside surface of the windshield at the portion along which said complemental member is not fitted to said molding body, and wherein said covering portion of said molding body is spaced from the outside surface of the windshield and the lower edge of said weir portion of said complemental member is seated on the outside surface of the windshield at the portion along which said complemental member is fitted into said molding body.

2. The molding unit as defined in claim 1, wherein said complemental member is fitted to said molding body along a part of said molding body which corresponds to a pillar of the automobile body.

3. The molding unit as defined in claim 2, wherein said complemental member is formed with an upper inclined portion at one end thereof, the inclination angle of said inclined portion being substantially equal to that of an inclined surface formed on the pillar.

4. The molding unit as defined in claim 2, wherein said molding body and said fasteners are formed of resilient material, and wherein the lower edge of said weir portion of said complemental member is longitudinally provided with a contacting member formed of resilient material.

5. The molding unit as defined in claim 2, wherein said molding body, said complemental member and said fasteners are formed of resilient material.

6. The molding unit as defined in claim 4 or 5, wherein said fastener is provided longitudinally with a projection projecting into said engagement groove, and wherein said fitting portion of said complemental member is formed longitudinally with a flanged portion, said flanged portion being engaged with said projection when said fitting portion of said complemental member is inserted into said engagement groove of said fastener.

7. A molding unit to seal a clearance between an automobile body and a windshield mounted on the automobile body, comprising:
a molding body having a leg portion extending along a circumferential edge of the windshield and a covering portion integrally provided on and extending along an upper side of said leg portion;
a complemental member longitudinally fitted along a part of said molding body, said complemental member having a weir portion and having a fitting portion which is integrally formed with said weir portion and is adapted to be fitted to said leg portion of said molding body; and
a plurality of fasteners provided on the automobile body for fastening said molding body fitted with said complemental member to the automobile body, each of said fasteners having an engagement groove,
wherein said fitting portion of said complemental member is removed to a portion thereof corresponding to said fastener so that said leg portion of said molding body is inserted into said engagement groove of said fastener where said molding body fitted with said complemental member is positioned along the windshield, wherein said covering portion of said molding body is seated on the outside surface of the windshield at the portion along which said complemental member is not fitted to said molding body, and wherein said covering portion of said molding body is spaced from the outside surface of the windshield and the lower edge of said weir portion of said complemental member is seated on the outside surface of the windshield at the portion along which said complemental member is fitted to said molding body.

8. The molding unit as defined in claim 7, wherein said complemental member is fitted to said molding body along a part of said molding body which corresponds to a pillar of the automobile body.

9. The molding unit as defined in claim 8, wherein said complemental member is formed with an upper inclined portion at one end thereof, the inclination angle of said inclined portion being substantially equal to that of an inclined surface formed on the pillar.

10. The molding unit as defined in claim 8, wherein said molding body and said fasteners are formed of resilient material, and wherein the lower edge of said weir portion of said complemental member is longitudinally provided with a contacting member formed of resilient material.

11. The molding unit as defined in claim 8, wherein said molding body, said complemental member and said fasteners are formed of resilient material.

12. The molding unit as defined in claim 10, 11, wherein said fastener is provided longitudinally with a projection projecting into said engagement groove, and wherein said leg portion of said molding body is formed longitudinally with a groove, said groove being engaged with said projection when said leg portion of said molding body is inserted into said engagement groove of said fastener.

* * * * *